United States Patent
Dohrn

(10) Patent No.: US 11,861,551 B1
(45) Date of Patent: Jan. 2, 2024

(54) APPARATUS AND METHODS OF TRANSPORT TOKEN TRACKING

(71) Applicant: Hammel Companies Inc., Pittsburgh, PA (US)

(72) Inventor: Joseph Charles Dohrn, Woodland Park, CO (US)

(73) Assignee: Hammel Companies Inc., Pittsburgh, PA (US)

( * ) Notice: Subject to any disclaimer, the term of this patent is extended or adjusted under 35 U.S.C. 154(b) by 0 days.

(21) Appl. No.: 17/976,146

(22) Filed: Oct. 28, 2022

(51) Int. Cl.
*G06Q 10/0833* (2023.01)
*G06Q 30/04* (2012.01)

(52) U.S. Cl.
CPC ......... *G06Q 10/0833* (2013.01); *G06Q 30/04* (2013.01)

(58) Field of Classification Search
CPC ............. G06Q 10/083; G06Q 10/0832; G06Q 10/0833; G06Q 10/0835; G06Q 10/0837; G06Q 10/0838
See application file for complete search history.

(56) References Cited

U.S. PATENT DOCUMENTS

| | | | |
|---|---|---|---|
| 10,936,992 B1 | 3/2021 | Rusnak | |
| 2010/0010918 A1* | 1/2010 | Hunt | G06Q 20/102 705/40 |
| 2015/0066752 A1* | 3/2015 | Phillips | G06Q 20/22 705/40 |
| 2016/0217399 A1 | 7/2016 | Roelofs | |
| 2018/0341910 A1* | 11/2018 | Broveleit | G06Q 50/28 |
| 2019/0385121 A1* | 12/2019 | Waliany | G06F 9/54 |
| 2022/0044190 A1 | 2/2022 | Estill | |
| 2022/0237614 A1* | 7/2022 | Lin | G06Q 20/28 |
| 2022/0284430 A1* | 9/2022 | Min | G06Q 20/24 |

FOREIGN PATENT DOCUMENTS

WO   WO-2021186211 A1 * 9/2021 ......... G06Q 30/0206

OTHER PUBLICATIONS

Wenzel et al., "A literature review on machine learning in supply chain management." Artificial Intelligence and Digital Transformation in Supply Chain Management: Innovative Approaches for Supply Chains. Proceedings of the Hamburg International Conference of Logistics (HICL), vol. 27 (Year: 2019).*

* cited by examiner

*Primary Examiner* — Emmett K. Walsh
(74) *Attorney, Agent, or Firm* — Caldwell Intellectual Property Law

(57) ABSTRACT

In an aspect an apparatus for transport token tracking is presented. An apparatus may include at least a processor and a memory communicatively connected to the at least a processor. A memory may include instructions configuring at least a processor to receive transport data of a transport. Processor may be configured to identify a transport token as a function of the transport data. Processor may also be configured to generate one or more summate values as a function of a comparison between the transport token and a token criteria. Processor may be configured to generate a data query requesting or searching for updated transport data of the transport. Processor may be configured to update the one or more stage subgroups as a function of the data query.

16 Claims, 7 Drawing Sheets

APPARATUS AND METHODS OF TRANSPORT TOKEN TRACKING

FIELD OF THE INVENTION

The present invention generally relates to the field of transportation. In particular, the present invention is directed to an apparatus and methods for transport token tracking.

BACKGROUND

Modern supply chains deal with many points of contact throughout a delivery. However, modern supply chain apparatuses are inefficient and can be improved.

SUMMARY OF THE DISCLOSURE

In an aspect an apparatus for transport management is presented. Apparatus includes at least a processor. Apparatus includes a memory communicatively connected to the at least a processor. Memory contains instructions configuring the at least a processor to receive transport data of a transport, wherein the transport comprises an attribute, identify a transport token as a function of the transport data, wherein the transport token may be associated with an attribute of the transport, compare the transport token with a token criteria, and generate a summate value as a function of the comparison.

In another aspect, a method of using an apparatus for transport management is presented. The method includes receiving, by a processor, transport data of a transport, wherein the transport comprises an attribute, identifying, by the processor, a transport token as a function of the transport data, wherein the transport token may be associated with an attribute of the transport, comparing, by the processor, the transport token with a token criteria, and generating, by the processor, a summate value as a function of the comparison.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and method for transport token tracking. More specifically, aspects of the present disclosure are directed to tracking of transport lifecycles, which may include one or more attributes of the transport. Aspects of the present disclosure can be used to monitor and/or track one or more transports through various stages of a transport. Transport data, which may include information related to one or more attributes of transport, may be used to identify a token. Identifying a token as a function of the transport data, where the token may be associated with an attribute of the transport, may include categorizing the transport data using a classification model into an attribute subgroup. Transport data may be continuously received from, for example, a transport entity so that attribute subgroups may be updated repeatedly in real-time. Aspects of the present disclosure allow for displaying organized transport data and/or tokens of transport through a graphical user interface (GUI). Exemplary embodiments illustrating aspects of the present disclosure are described below in the context of several specific examples.

Figure 1:
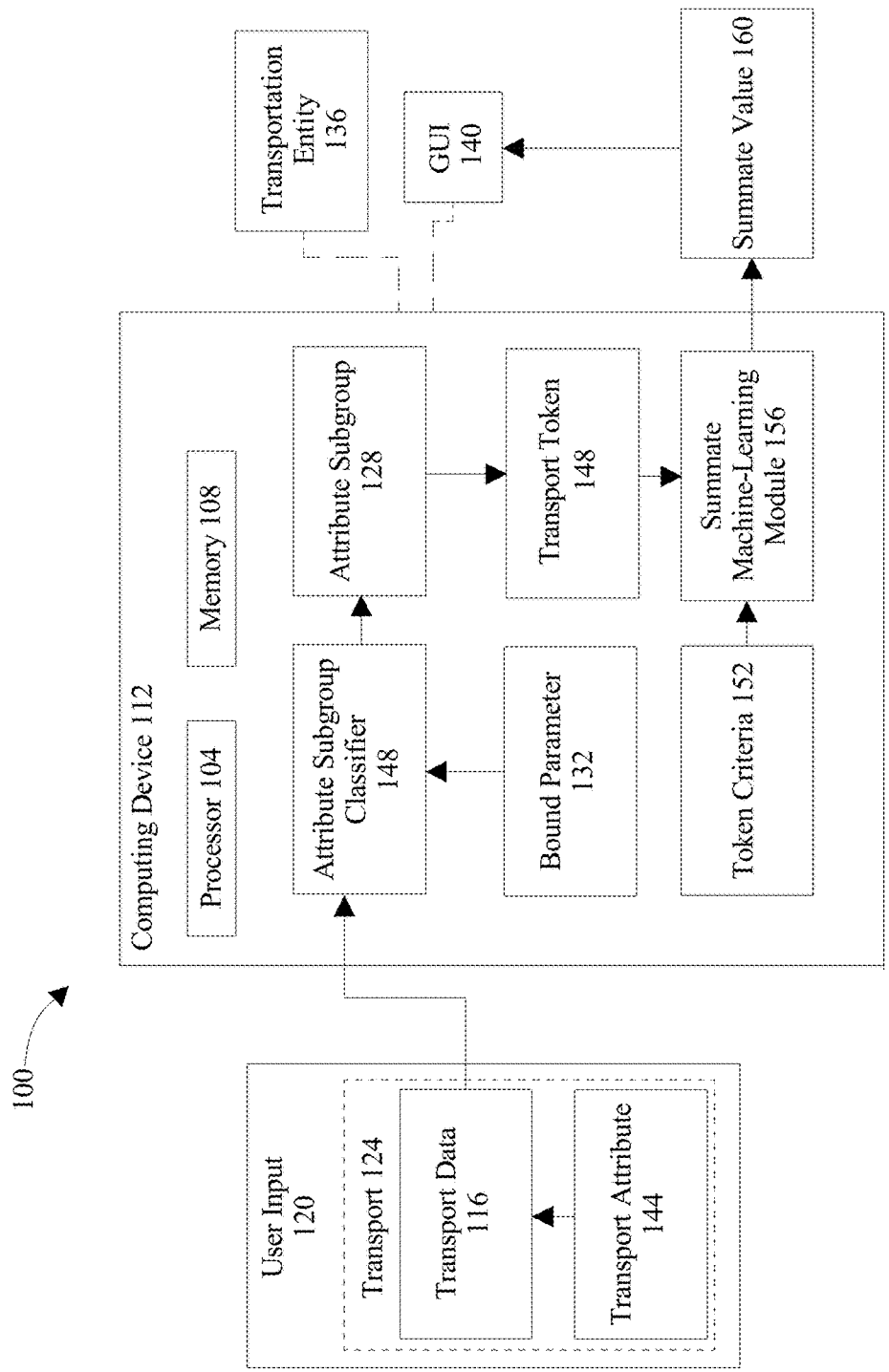
FIG. 1 is a block diagram of an apparatus for transport token tracking in accordance with one or more embodiments of the present disclosure.

Referring now to FIG. 1, an exemplary embodiment of an apparatus 100 for transport management is illustrated. Apparatus 100 may include at least a processor 104 and a memory 108 communicatively connected to the processor 104. Memory 108 may include instructions configuring processor 104 to perform various tasks. In some embodiments, apparatus 100 may include a computing device 112, where computing device includes processor 104 and/or memory 108. As used in this disclosure, "communicatively connected" means connected by way of a connection, attachment or linkage between two or more relate which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, apparatus 100 may include any computing device as described in this disclosure, including without limitation a microcontroller, microprocessor, digital signal processor (DSP), and/or system on a chip (SoC) as described in this disclosure. Processor 104 may be computing device 112, be an integrated component of computing device 112. Computing device 112 may include, be included in, and/or communicate with a mobile device such as a mobile telephone or smartphone. For example, and without limitation, computing device 112 may communicate with a remote device of, for example, a transportation entity. A computing device may include a single computing device operating independently, or may include two or more computing device operating in concert, in parallel, sequentially or the like; two or more computing devices may be included together in a single computing device or in two or more computing devices. A computing device may interface or communicate with one or more additional devices as described below in further detail via a network interface device. Network interface device may be utilized for connecting a computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. A computing device may include but is not limited to, for example, a computing device or cluster of computing devices in a first location and a second computing device or cluster of computing devices in a second location. A computing device may include one or more computing devices dedicated to data storage, security, distribution of traffic for load balancing, and the like. A computing device may distribute one or more computing tasks as described below across a plurality of computing devices of computing device, which may operate in parallel, in series, redundantly, or in any other manner used for distribution of tasks or memory between computing devices. A computing device may be implemented using a "shared nothing" architecture in which data is cached at the worker, in an embodiment, this may enable scalability of apparatus 100 and/or computing device.

With continued reference to FIG. 1, computing device 112 may be designed and/or configured to perform any method, method step, or sequence of method steps in any embodiment described in this disclosure, in any order and with any degree of repetition. For instance, a computing device 112 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 112 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, apparatus 100, such as computing device 112 or processor 104, may receive transport data 116. For the purposes of this disclosure, "transport data" is information pertaining to a transport. More specifically, transport data includes information associated with one or more attributes of a transport. For the purposes of this disclosure, an "attribute" of a transport is a characteristic of a transport. In some embodiments, an attribute may include a stage of transport, dates, times, geographical locations, costs, routes, transportation vehicles, and the like. For instance, and without limitation, an attribute may include one or more dates, such as a departure date or an arrival date of a shipment. In another instance, and without limitation, an attribute may include a time, such as a departure time of a transport, an arrival time of a transport, a checkpoint time of a transport, an inspection time of a transport, and the like. In another instance, and without limitation, an attribute may include a geographical location, such as an origin, a destination, a current geographic location of a transportation vehicle, a checkpoint, an inspection location, and the like. In other instances, and without limitation, an attribute may include a cost, such as a partial or full cost of a transport or a portion of a transport. In other instances, and without limitation, an attribute may include a route, such as a road, a direction of travel, an orientation, a path (e.g., pathway), and the like. In other instances, and without limitation, an attribute may include types of one or more transportation vehicles used during one or more portions of transport. In one or more embodiments, transport data 116 associated with attribute of transport may include, without limitation, origins, destinations, geographical data, estimated delivery times, estimated costs, and the like. For the purposes of this disclosure, "geographical data", or "geospatial data", is information related to positioning or locations of a transport relative to Earth. Geographical data may include points, lines, and/or area (e.g., polygons). For instance, and without limitation, geographical data may include, without limitation, GPS coordinates, altitude, longitude, latitude, and the like. In some embodiments, geographical data may include relative location data. "Relative location data" as used in this disclosure is information pertaining to a particular geographical point. Relative location data may include, for instance and without limitation, distances between two or more geographical points, closest points of interest, and the like. A "transport", for the purposes of this disclosure, is a movement of one or more objects between two or more locations. Thus, a transport, such as transport 124, includes a transportation of cargo. For instance, and without limitation, a transport includes one or more processes of moving cargo, such as from one location (e.g., an origin) to another location (e.g., a destination) using a transport vehicle. Transport 124 may include, without limitation, transport vehicles, transport components, and the like. "Transport vehicles" as used in this disclosure are devices configured to provide locomotive capabilities. Transport vehicles may include, without limitation, cars, trucks, motorcycles, boats, planes, drones, bicycles, any other mobile structure, and the like. "Transport components" as used in this disclosure are objects that are moved between two or more locations. Transport components may include cargo. Transport components may include, without limitation, construction materials, electronics, perishables, food, consumer goods, clothes, industrial equipment, parcels, freight shipments, and the like.

Still referring to FIG. 1, in some embodiments, transport data 116 may include transport component data. "Transport component data" as used throughout this disclosure is information pertaining to objects of a transport. Transport component data may include, without limitation, dimensions such as height, width, length, volume, and the like. Transport component data may include, without limitation, values of components, costs associated with transporting components, and the like. For instance, and without limitation, transport component data of transport data 116 may include a value of $510.27 for a package of apples in bulk. In some embodiments, transport component data may include one or more transport component statuses. A "transport component status" as used in this disclosure is a condition of a transport component. A transport component status may include, without limitation, hazardous material, frangible, damaged, and/or other conditions. In some embodiments, transport data 116 may include one or more transport characteristics. A "transport characteristic", as used in this disclosure, is an attribute relating to a transport type. Transport characteristics may include, without limitation, expedited, overnight, freight, parcel, international, domestic, land, sea, air, and the like. In some embodiments, apparatus 100 may use a transport characteristic classifier to classify transport 124 to one or more transport characteristic categories. A transport characteristic classifier may be trained with training data correlating transport data to transport characteristic groupings, such as, without limitation, freight, expedited, hazardous, parcel, international, domestic, land, sea, air, overnight, and the like. Training data may be received from an external computing device, user input, and/or previous iterations of processing. A transport characteristic classifier may be configured to input transport data 116 and categorize transport 124 and/or transport components of transport 124 to one or more characteristics groupings.

Still referring to FIG. 1, transport data 116 may be received by a user input 120. Still referring to FIG. 1, in some embodiments, apparatus 100 may receive transport data 116 from one or more external computing devices, such as without limitation servers, desktops, smartphones, tablets, and the like. "User input", as used in this disclosure, is a form of data entry received from an individual and/or group of individuals. User input 120 may include, but is not limited to, text input, engagement with icons of a graphical user interface (GUI), and the like. Text input may include, without limitation, entry of characters, words, strings, symbols, and the like. In some embodiments, user input 120 may include one or more interactions with one or more elements of a graphical user interface (GUI), such as GUI 140. A "graphical user interface" as used in this disclosure is an interface including set of one or more pictorial and/or graphical icons corresponding to one or more computer actions. GUI 140 may be configured to receive user input 120. GUI 140 may include one or more event handlers. An "event handler" as used in this disclosure is a callback routine that operates asynchronously once an event takes place. Event handlers may include, without limitation, one or more programs to perform one or more actions based on user input, such as generating pop-up windows, submitting forms, changing background colors of a webpage, and the like. Event handlers may be programmed for specific user input, such as, but not limited to, mouse clicks, mouse hovering, touchscreen input, keystrokes, and the like. For instance, and without limitation, an event handler may be programmed to generate a pop-up window if a user double clicks on a specific icon. User input 120 may include, a manipulation of computer icons, such as, but not limited to, clicking, selecting, dragging and dropping, scrolling, and the like. In some embodiments, user input 120 may include an entry of characters and/or symbols in a user input field. A "user input field" as used in this disclosure is a portion of graphical user interface configured to receive data from an individual. A user input field may include, but is not limited to, text boxes, search fields, filtering fields, and the like. In some embodiments, user input 120 may include touch input. Touch input may include, but is not limited to, single taps, double taps, triple taps, long presses, swiping gestures, and the like. In some embodiments, GUI 140 may be displayed on, without limitation, monitors, smartphones, tablets, vehicle displays, and the like. Vehicle displays may include, without limitation, monitors and/or systems in a vehicle such as multimedia centers, digital cockpits, entertainment systems, and the like. One of ordinary skill in the art upon reading this disclosure will appreciate the various ways a user may interact with graphical user interface.

Still referring to FIG. 1, transport data 116 may include one or more unique identifiers and/or be assigned one or more unique identifiers generated through apparatus 100, such as through processor 104. A unique identifier may include any combination of alpha and/or numerical values, where there may be any total of values included in the unique identifier. Each unique identifier may be associated with a transport component, group of transport components, and/or transports 124. For example, and without limitation, a unique identifier may include a combination of seven alpha and/or numeric values, such as "N303363", "K994002", "F110482", "AKK13257", and the like. In some nonlimiting embodiments, unique identifiers may be used to generate a data query, as discussed further below. In an embodiment, there is no limitation to the number of unit identifiers included in each communication of the plurality of communication. Persons skilled in the art, upon reviewing the entirety of this disclosure, will be aware of various examples of unique identifiers that may be used as the unit identifier datum consistently with this disclosure.

Still referring to FIG. 1, processor 104 is configured to identify a transport token 148 as a function of transport data 116, where transport token 148 may be associated with an attribute of transport 124. For the purposes of this disclosure, a "transport token" is a quantitative information representing an expense of a transport, or a characteristic of a transport. Thus, transport token 148 may include monetary information (e.g., value and/or amount of a currency) related to one or more characteristics of transport 124. For instance, and without limitation, transport token 148 may include an amount of a particular currency. For example, and without limitation, transport token 148 may include one or more remittance, payment, invoice, adjusted payment, and the like. In a nonlimiting exemplary embodiment, transport token 148 may include a pecuniary amount for a customer to pay to one or more transportation entities for conducting and/or completing transport 124. In one or more embodiments, the value associated with transport token 148 may vary based on one or more characteristics of transport 124. For instance, transport token 148 may include a different cost value for a transport having a duration of two business days compared to a transport having a duration of five business days for the same goods. In another example, and without limitation, a value of transport token 148 may include an amount due for payment by a specific date, the date may vary based on a progress status of transport however (e.g., not initiated, in progress, or completed). For instance, and without limitation, transport token 148 may include an amount of $0 for a due payment while transport status is "in progress" (e.g., the cargo of transport has not reach a designated destination), and transport token 148 may change to an amount of $1000 once transport status is changed to "completed" (e.g., the cargo of transport has reach the designated destination), as discussed further in this disclosure.

In some embodiments, apparatus 100 may include a language processing module. A language processing module may include any hardware and/or software module. A language processing module may be configured to extract, from the one or more documents, communications, or data, one or more words. One or more words may include, without limitation, strings of one or more characters, including, and without limitation, any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text. In some embodiments, a token may be a transport token 148. Tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model. For instance, and without limitation, textual data representing transport data may be parsed to identify one or more tokens related to attributes of transport 124. For example, and without limitation, a communication from a transport entity, such as a carrier, containing transport data 116 related to a pecuniary amount for transport 124 may be parsed to identify a token associated with a cost of at least a portion of transport 124. In some embodiments, language processing module may be used to identify transport tokens 148. For example, in some embodiments, language processing module may identify transport tokens 148 from tokens based on the content of transport tokens 148 and/or the surrounding context. As a non-limiting example, language processing module may determine that any token that follows a word or symbol such as "amount," "cost," "invoice," "$," "€," and/or the like may be a transport token 148. As a non-limiting example, language processing module may determine that any token that proceeds a word or symbol such as "$," "€," "yen," "dollars," "cost," and the like may be a transport token 148. As a non-limiting example, language processing module may determine that any token that comprises only numbers may be transport token 148.

Still referring to FIG. 1, a language processing module may operate to produce a language processing model. A language processing model may include a program automatically generated by computing device and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

Still referring to 1, a language processing module and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used in this disclosure are statistical models with inference algorithms that that may be applied to the models. In such models, a hidden state to be estimated may include an association between extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 1, generating a language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, a language processing module may use a corpus of documents to generate associations between language elements in a language processing module, and diagnostic engine may then use such associations to analyze words extracted from one or more documents and determine that the one or more documents indicate significance of a category. In an embodiment, language module and/or apparatus 100 may perform this analysis using a selected set of significant documents, such as documents identified by one or more experts as representing good information; experts may identify or enter such documents via graphical user interface, or may communicate identities of significant documents according to any other suitable method of electronic communication, or by providing such identity to other persons who may enter such identifications into apparatus 100. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York. In some embodiments, apparatus 100 may determine one or more characters, symbols, strings, phrases, and the like of user input 120. Apparatus 100 may determine one or more characters, symbols, strings, phrases, and the like using a language processing module as described above. Apparatus 100 may compare determined text of user input 120 and/or other input through comparing received input, such as user input 120, to one or more databases. Databases may include, without limitation, warehouse management systems, websites, and the like.

Still referring to FIG. 1, transport token 148 may be identified as a function of an attribute subgroup 128. In various embodiments, transport token 148 may be identified using a classifier that may classify transport data 116 to one or more categories of a transport 124. An "attribute subgroup" as used in this disclosure is a classification or category of an attribute of a transport. In one or more embodiments, and without limitation, a category of an attribute may include fees, invoices, adjustment payments, stages, transport characteristics, and the like. In one or more embodiments, an attribute subgroup 128 may include a stage subgroup. A "stage subgroup" as used in this disclosure is a classification of a stage of a transport. For the purposes of this disclosure, a "stage" of a transport is a period or step of a transport. A stage of a transport may include a status of a transport, and/or corresponding transport plan, or a point of a lifecycle, or transport plan, of a transport. For example, and without limitation, a stage of a transport may include a temporal and/or geographical description of a transport. Stage subgroup may include one or more transports, transport components, and the like. Stage subgroup may include a status of a transport plan. A status of a transport plan may include categories such as, but not limited to, "outbound", "inbound", "in transit", "holding" or "on hold", "not started", "stopped", "at origin", "at checkpoint", "at destination", "domestic transit", "international transit", "delivered", "shipped", and the like. A "transport plan" as used in this disclosure is a set of one or more steps to complete a transport. A transport plan may include, without limitation, one or more vehicles, transport components, routes, origins, destinations, and the like. For example, and without limitation, an attribute subgroup may include a stage or leg of transport 124. A stage of transport 124 may include a portion of transport, such as trip generation, lading, transit, inspection, leaving origin, arriving at destination, and the like. Transport token 148 may include costs associate with one or more stages of transport. For instance, and without limitation, transport token 148 may include a cost or bill associated with the completion of a transport (e.g., arriving at a final destination), where transport data 116 may include geographical data that may allow transport to be categorized as "completed". Transport token 148, such as an invoice, associated with a completed transport may then be identified as a function of the stage of transport. In another nonlimiting exemplary embodiment, attribute subgroup 128 may include a temporal subgroup, where transport, or a portion of transport, is categorized according to one or more time characteristics. For example, and without limitation, for transport to be complete may take a specific duration of time; transport token 148 may be identified as a function of the duration it took for transport to be completed.

Still referring to FIG. 1, categorizing transport 124 into one or more attribute subgroups 128 may include arranging and/or sorting transport 124 into one or more groupings. In some embodiments, apparatus 100 may compare one or more category criteria to transport data 116 of transport 124. In some embodiments, apparatus 100 may categorize transport 124 into attribute subgroup 128 as a function of a bound parameter 132. A "bound parameter", as used in this disclosure, is a criterion constraining a transport categorization. Bound parameter 132 may include, but is not limited to, geographical limitations, such as destinations and origins, transport recipients, transport component types, temporal limitations, and the like. For instance, and without limitation, transport 124 may be categorized to attribute subgroup 128, using a bound parameter of a specific recipient address associated with a transport. In some embodiments, transport 124 may be categorized to a different attribute subgroup 128 throughout a lifecycle, or transport plan, of transport 124, as previously mentioned. For instance, and without limitation, transport 124 may be categorized into a first stage subgroup based on a first stop of a transport plan of transport 124. Transport 124 may arrive at a second stop of a transport plan, of which apparatus 100 may categorize transport 124 to a second stage subgroup. In some embodiments, transport 124 may be divided into multiple stage subgroups. For instance, and without limitation, transport 124 may include a plurality of transport components (e.g., goods or cargo) that may all have different destinations. Apparatus 100 may categorize each transport component of transport 124 to one or more attribute subgroups, such as, without limitation, attribute subgroups 128 having a same fee, adjusted payment, travel time, destination, and the like.

Still referring to FIG. 1, in some embodiments, attribute subgroup 128 may include one or more transport identifiers. For the purposes of this disclosure, "transport identifiers" as used in this disclosure are unique elements that denote a transport and/or an attribute of a transport. Transport identifiers may include, without limitation, unique identifiers, serial numbers, and the like. Apparatus 100 may generate and/or assign one or more transport identifiers for one or more transports 124 and/or attribute subgroups 128. Transport identifiers may denote one or more transport components of transport 124. In some embodiments, user input 120 may include a search for a transport, such as transport 124, by a unique identifier. In other embodiments, user input 120 may include a search for an attribute subgroup by a unique identifier, which then pulls up all transports categorized into a particular attribute subgroup. Apparatus 100 may be configured to locate transport 124 and/or transport data 116 as a function of a unique identifier. Apparatus 100 may display a unique identifier, transport 124, attribute subgroup 128, and the like, without limitation, through GUI 140.

In some embodiments, and still referring to FIG. 1, apparatus 100 may use an objective function to categorize transport 124, and/or characteristics of transport 124, into one or more attribute subgroups 128. An "objective function" as used in this disclosure is a process of minimizing or maximizing one or more values based on a set of constraints. Apparatus 100 may generate an objective function to optimize a comparison of transport data 116 to one or more bound parameters 132. In some embodiments, an objective function of apparatus 100 may include an optimization criterion. An optimization criterion may include any description of a desired value or range of values for one or more attributes of bound parameter 132. Desired value or range of values may include a maximal or minimal value, a range between maximal or minimal values, or an instruction to maximize or minimize bound parameter 132. As a nonlimiting example, an optimization criterion may specify that transport 124 should be categorized to attribute subgroup 128 having transport data 116 within a 4% difference of bound parameter 132. An optimization criterion may cap a difference of transport data 116 and bound parameter 132, for instance, specifying that transport data 116 must not have a difference from bound parameter 132 greater than a specified value. An optimization criterion may specify one or more tolerances for differences in bound parameters 132. An optimization criterion may specify one or more desired transport criteria for transport data 116. In an embodiment, an optimization criterion may assign weights to different bound parameters 132 or values associated with transports 124. Weights, as used herein, may be multipliers or other scalar numbers reflecting a relative importance of a particular bound parameter 132 or value. One or more weights may be expressions of value to a user of a particular outcome, transport value, or other facet of a categorization process. Value may be expressed, as a nonlimiting example, in remunerative form, such as a quickest delivery, a strongest reliability, transport recipient preferences, or the like. As a non-limiting example, minimization of differences of a transport data 116 and one or more bound parameters 132 may be multiplied by a first weight, while tolerance above a certain value may be multiplied by a second weight. Optimization criteria may be combined in weighted or unweighted combinations into a function reflecting an overall outcome desired by a user; a function may be a transport function to be minimized and/or maximized. A function may be defined by reference to transport criteria constraints and/or weighted aggregation thereof as provided by apparatus 100; for instance, a bound parameter 132 function combining optimization criteria may seek to minimize or maximize a function of attribute subgroup 128 classification.

Still referring to FIG. 1, apparatus 100 may use an objective function to compare measured transport data 116 to bound parameter 132. Generation of an objective function may include generation of a function to score and weight factors to achieve transport data 116 for each feasible pairing. In some embodiments, pairings may be scored in a matrix for optimization, where columns represent transports 124 and rows represent attribute subgroups 128 potentially paired therewith. Each cell of such a matrix may represent a score of a pairing of the corresponding transport 124 to the corresponding attribute subgroup 128. In some embodiments, assigning a predicted process that optimizes the objective function includes performing a greedy algorithm process. A "greedy algorithm" is defined as an algorithm that selects locally optimal choices, which may or may not generate a globally optimal solution. For instance, apparatus 100 may select pairings so that scores associated therewith are the best score for each transport 124, attribute subgroup 128, transport data 116, and/or for each bound parameter 132. In such an example, optimization may determine the combination of attribute subgroup 128 matches such that each attribute subgroup 128 pairing includes the highest score possible.

Still referring to FIG. 1, an objective function may be formulated as a linear objective function. Apparatus 100 may solve an objective function using a linear program such as without limitation a mixed-integer program. A "linear program," as used in this disclosure, is a program that optimizes a linear objective function, given at least a constraint. For instance, and without limitation, objective function may seek to maximize a total score $\Sigma_{r \in R} \Sigma_{s \in S} c_{rs} x_{rs}$, where R is a set of all transports r, S is a set of all stage subgroups s, $c_{rs}$ is a score of a pairing of a given transport with a given stage subgroup, and $x_{rs}$ is 1 if a transport r is paired with a stage subgroup s, and 0 otherwise. Continuing the example, constraints may specify that each transport is assigned to only one stage subgroup, and each stage subgroup is assigned only one transport. Transports and stage subgroups may include transports and stage subgroups as described above. Sets of bound parameters may be optimized for a maximum score combination of all generated bound parameters. In various embodiments, apparatus 100 may determine a combination of transport data and/or transports that maximizes a total score subject to a constraint that all transports are paired to exactly one stage subgroup. Not all stage subgroups may receive a transport pairing since each stage subgroup may only produce one transport. In some embodiments, an objective function may be formulated as a mixed integer optimization function. A "mixed integer optimization" as used in this disclosure is a program in which some or all of the variables are restricted to be integers. A mathematical solver may be implemented to solve for the set of feasible pairings that maximizes the sum of scores across all pairings; mathematical solver may be implemented on apparatus 100 and/or another device, and/or may be implemented on third-party solver.

With continued reference to FIG. 1, optimizing an objective function may include minimizing a loss function, where a "loss function" is an expression an output of which an optimization algorithm minimizes to generate an optimal result. As a non-limiting example, apparatus 100 may assign variables relating to a set of parameters, which may correspond to score bound parameters as described above, calculate an output of mathematical expression using the variables, and select a pairing that produces an output having the lowest size, according to a given definition of "size," of the set of outputs representing each of plurality of transport combinations; size may, for instance, included absolute value, numerical size, or the like. Selection of different loss functions may result in identification of different potential pairings as generating minimal outputs. Objectives represented in an objective function and/or loss function may include minimization of differences between transport data and bound parameters. Objectives may include minimization of time of transporting one or more transport components. Objectives may include minimization of fuel used, cost of transport, and the like.

Still referring to FIG. 1, in some embodiments, apparatus 100 may utilize an attribute subgroup classifier 148. Attribute subgroup classifier 148 may be trained with training data correlating transport data to stage subgroups, such as, and without limitation, same destination, same transport component type, same transport characteristic grouping, and the like. Training data may be received from user input, external computing devices, and/or previous iterations of processing. In some embodiments, attribute subgroup classifier 148 may input transport data 116 and output a classification of transport data 116 to one or more attribute subgroups 128.

Still referring to FIG. 1, in some embodiments, apparatus 100 may categorize transport 124 to attribute subgroup 128 preemptively as a function of predicted bound parameters 132. Apparatus 100 may utilize a bound parameter machine-learning model. A bound parameter machine-learning model may be trained with training data correlating transport data 116 to bound parameters 132. Training data may be received through user input, external computing devices, databases, and/or previous iterations of processing. A bound parameter machine-learning model may input transport data 116 and output bound parameters 132. Apparatus 100 may use a bound parameter machine-learning model to predict attribute subgroup 128 of transport 124. For instance, and without limitation, apparatus 100 may predict bound parameter 132 to include a transport path of transport 124 and may categorize transport 124 to attribute subgroup 128 as a function of the predicted bound parameter 132. Any machine-learning model, classifier, and/or other algorithms may be trained on external computing devices and algorithm parameters and/or coefficients may be communicated to apparatus 100, without limitation. In some embodiments, apparatus 100 may train any machine-learning model, classifier, and/or other algorithms as described throughout this disclosure, without limitation.

Still referring to FIG. 1, in some embodiments, apparatus 100 may be configured to communicate with a transportation entity 136. A "transportation entity", as used in this disclosure, is an individual and/or organization involved in a transport. Transportation entity 136 may include, but is not limited to, recipients, carriers, warehouses, computer servers, and the like. Apparatus 100 may communicate with one or more computing devices of transportation entity 136. For example, and without limitation, apparatus 100 may be communicatively connected to one or more computing devices of transportation entity 136. A computing device of transportation entity 136 may include, without limitation, desktops, laptops, smartphones, servers, tablets, and the like. In some embodiments, apparatus 100 may be configured to communicate transport data 116 and/or categorizations of transport 124 with transportation entity 136. For instance, and without limitation, apparatus 100 may communicate origins, destinations, transport paths, costs, transport components, and/or other data of transport data 116 with transportation entity 136. In some embodiments, transportation entity 136 may communicate transport data and/or updates of transport data with apparatus 100. Updates of transport data 116 may include, without limitation, transport status, transport characteristic grouping, geographical data, estimated delivery, estimated departure, total transit time, damage analysis, remittance updates, and the like, as discussed further in this disclosure.

Still referring to FIG. 1, in some embodiments, apparatus 100 may be configured to display transport 124, transport data 116, and/or other forms of data through GUI 140. In some embodiments, GUI 140 may be shown on a display of computing device 112. GUI 140 may include one or more windows that may display transport data 116. GUI 140 may be configured to display, without limitation, transport status updates, transport characteristics, delivery statuses, and the like. GUI 140 may be as described below with reference to FIG. 4.

Still referring to FIG. 1, in some embodiments, apparatus 100 may store transport data 116, transport token 148, communication data, and/or other data in an immutable sequential listing. "Communication data" as used throughout this disclosure is information pertaining to data transmitted and/or received between two or more entities. Communication data may include, without limitation, dates, times, sender identities, receiver identities, network type, message length, and/or other types of information related to communications. In some embodiments, apparatus 100 may compare any data as described throughout this disclosure with one or more blocks of data of an immutable sequential listing. An immutable sequential listing may be as described below with reference to FIG. 5.

Still referring to FIG. 1, in some embodiments, processor 104 may be configured to compare transport token 148 to token criteria 152. For the purposes of this disclosure, a "token criteria" is a threshold having a predetermined range or limit related to an expected and/or acceptable value associated with a transport token 148. For instance, and without limitation, token criteria 152 may include an acceptable cost of at least a portion of transport 124. For instance, and without limitation, token criterion 152 may include a preapproved and/or predetermined transport token value, a quantity of previous transport tokens from prior similar transports or preceding portions of a transport, a receival of a transport token associated with a specific transport and/or carrier, and the like. For example, and without limitation, a transport token may include an outstanding bill for a customer. If token criterion, which may include a pecuniary amount by the customer toward the outstanding bill, is less than may include a value related to a first pecuniary amount by a customer toward a portion of a bill. If the transport token 148, for example, an outstanding bill related to a second pecuniary amount by a customer, where the transport token 148 includes a is below token criterion. For example, and without limitation, token criteria 152 may include an expected range for a cost to ship moveable goods from a first location to a second location during transport 124. In another example, and without limitation, token criteria 152 may include an expected amount for a bill of lading. In another example, and without limitation, token criteria 152 may include an expected delivery date of transport 124. In one or more embodiments, comparing transport token 148 and token criteria 152 may allow for verification or validation of transport token 148, as discussed further below.

Still referring to FIG. 1, predetermined ranges or limits of values may include a maximal or minimal value, a range between maximal or minimal values, or an instruction to maximize or minimize transport token 148. As a nonlimiting example, a token criteria 152 may specify that transport 124 should be categorized to attribute subgroup 128 having transport data 116 within a 4% difference of a set threshold. A difference between transport data 116 and token criterion 152 may be capped based on desired values set by, for example, a transportation entity or a customer. For instance, specifying that transport token 148 must not have a difference from token criterion greater than a specified value. Token criteria 152 may specify one or more tolerances for differences in of the comparison between transport token 148 and token criteria 152. Token criterion 152 may specify one or more desired values or amount for transport token 148. In an embodiment, token criteria may assign weights to different transport tokens 148 or corresponding attributes associated with transport 124. One or more weights may be expressions of value to a user of a particular outcome, transport value, or other facet of a categorization process. Value may be expressed, as a nonlimiting example, in remunerative form, such as a quickest delivery, a strongest reliability, the lowest cost, transport recipient preferences, or the like. As a nonlimiting example, minimization of differences of a comparison may be multiplied by a first weight, while tolerance above a certain value may be multiplied by a second weight. Token criteria 152 may be combined in weighted or unweighted combinations into a function reflecting an overall outcome desired by a user; a function may be a transport function to be minimized and/or maximized. In one or more embodiments, an objective function may be used for the comparison of transport token 148 and token criteria 152.

Still referring to FIG. 1, in various embodiments, apparatus 100 may verify and/or validate transport token 148 through an immutable sequential listing. In one or more embodiments, transport token 148 may be stored on an immutable sequential listing. As used in this disclosure, "verification" is a process of ensuring that which is being "verified" complies with certain constraints, for example without limitation system requirements, regulations, and the like. In some cases, verification may include comparing data, such as without limitation, transport token 148, against one or more acceptance criteria, such as token criteria 152. For example, in some cases, transport token 148 may be required to include a secure token, identifier, and the like. Ensuring that transport token 148 is in compliance with acceptance criteria may, in some cases, constitute verification. In some cases, verification may include ensuring that data is complete, for example, that all required data types, are present, readable, uncorrupted, and/or otherwise useful for apparatus 100. In some cases, some or all verification processes may be performed by apparatus 100. In some cases, at least a machine-learning process, for example a machine-learning model, may be used to verify transport token 148. Apparatus 100 may use any machine-learning process described in this disclosure for this or any other function. In some embodiments, at least one of validation and/or verification includes without limitation one or more of supervisory validation, machine-learning processes, graph-based validation, geometry-based validation, and rules-based validation.

Still referring to FIG. 1, as used in this disclosure, "validation" is a process of ensuring that which is being "validated" complies with stakeholder expectations and/or desires. Stakeholders may include users, administrators, property owners, customers, and the like. Very often a specification prescribes certain testable conditions (e.g., metrics) that codify relevant stakeholder expectations and/or desires. In some cases, validation includes comparing data, for example and without limitation, transport token 148, against a preconfigured specification. In some cases, apparatus 100 may be additionally configured to validate data by validating constituent sub-data. In some embodiments, apparatus 100 may be configured to validate any transport, transport component, transport entity, payments, and the like. In some cases, at least a machine-learning process, for example a machine-learning model, may be used to validate by apparatus 100. Apparatus 100 may use any machine-learning process described in this disclosure for this or any other function.

Still referring to FIG. 1, processor 100 may be configured to generate a summate value 160 as a function of the comparison of transport token 148 and token criteria 152. For the purposes of this disclosure, a "summate value" is a total value associated with one or more transport tokens of a transport. Summate value 160 may include, in one or more nonlimiting embodiments values associated with an invoice, payment, fees, bills, and the like. For the purposes of this disclosure, an "invoice" is a statement of fees associated with goods or services provided. In one or more embodiments, summate value 160 may be generated as a function of a comparison between transport token 148 and token criteria 152, where the comparison indicates that transport token 148 substantially matches token criteria 152 (e.g., falls within a range or does not exceed a predetermined limit). For instance, and without limitation, a first transport token may include a payment by a customer for a transport, a second transport token may include a customer bill for transporting a particular good of transport, and token criteria may include a minimum threshold for a payment of the bill. If transport token (e.g., customer payment) is less than token criterion (e.g., minimum payment due by customer), then summate value may include a value for a remaining outstanding bill that the customer is still required to pay. In other embodiments, token criteria 152 may include a date, such as a time, day, month, and/or year, by when a customer must pay an outstanding balance of a bill by. If transport token (e.g., due date of payment of bill by customer) exceeds token criterion (e.g., current date), then summate value (e.g., comprehensive bill) may include an outstanding balance in addition to an interest or late fee for the late or missed payment. In various embodiments, summate value 160 may be generated using a summate machine-learning module 156. In one or more embodiments, summate machine-learning module may generate a summate machine-learning model using training data, which may include inputs and corresponding outputs, as discussed further in FIG. 5. For instance, and without limitation, training data may include inputs comprising transport token inputs and token criteria inputs, and training data may include correlated outputs comprising summate value outputs. Training data may be used to generate summate machine-learning model by summate machine-earning module. Once generated, then summate machine-learning model may receive real-time inputs, continuously or discretely over time, to generate corresponding outputs, such as summate value 160. In one or more embodiments, summate value 160 may be displayed to a user, such as a customer or transportation entity 136, through GUI 140 shown on a display of computing device 112 or a remote device. In various embodiments, GUI 140 may show acquisition of one or more transport tokens and a breakdown of summate value 160.

Still referring to FIG. 1, apparatus 100 may be configured to generate a data query. In some embodiments, data query may include apparatus 100 transmitting a query signal and pinging an external computing device, such as a device of transportation entity 136, to request additional data and/or information related to transport 124 so that summate value 160 may be updated in real-time (e.g., continuously or discretely). In nonlimiting embodiments, an external computing device may include a remote user device of transportation entity 136. In other nonlimiting embodiments, an external computing device may include a computing device of a carrier, such as an operator of a transport vehicle, warehouse personnel, a customer, and the like. In other embodiments, data query may include apparatus generating an alert, such as an audio or visual alert on a display of computing device 112, prompting a user to input additional, such as updated transport data 148 by user input 120.

Still referring to FIG. 1, in one or more embodiments, generating a data query may include searching a transport database for updated transport data 148, which may be used for updating summate value 160. In some embodiments, apparatus 100 may search for one or more characters in one or more databases through generating data query. A "data query", as used in this disclosure, is a function that retrieves data based on a criterion. In one or more embodiments, apparatus 100 may associate user input 120 with transport data 116 of one or more databases by performing a text retrieval process as a function of a keyword through a search query. In some embodiments, text searching may include querying, such as generating a search query. In some cases, a data query may include any number of querying tools, including without limitation keywords (as described above), field-restricted search, Boolean queries, phrase search, concept search, concordance search, proximity search, regular expression, fuzzy search, wildcard search, and the like. In some cases, keywords may be used to perform a query. In some cases, a document creator (or trained indexers) may supply a list of words that describe subject of the document, including without limitation synonyms of words that describe the subject. In some cases, keywords may improve recall; for instance, if the keyword list includes a keyword that is not in text of a document. In some cases, querying tools may include field-restricted search. A field-restricted search may allow a queries scope to be limited to within a particular field within a stored data record, such as "Title" or "Author." In some cases, a query tool may include Boolean queries. Searches that use Boolean operators (for example, "encyclopedia" AND "online" NOT "Encarta") can dramatically increase precision of a search. In some cases, an AND operator may say, in effect, "Do not retrieve any document unless it contains both of these terms." In some cases, a NOT operator may say, in effect, "Do not retrieve any document that contains this word." In some cases, a retrieval list retrieving too few documents, may prompt and OR operator to be used in place of an AND operator to increase recall; consider, for example, "encyclopedia" AND "online" OR "Internet" NOT "Encarta". This search will retrieve documents about online encyclopedias that use the term "Internet" instead of "online." In some cases, search precision and recall are interdependent and negatively correlated in text searching. In some cases, a query tool may include phrase search. In some cases, a phrase search may match only those documents that contain a specified phrase. In some cases, a query tool may include a concept search. In some cases, a concept search may be based on multi-word concepts, for example compound term processing. In some cases, a query tool may include a concordance search. In some cases, a concordance search may produce an alphabetical list of all principal words that occur in a text and may include their immediate context. In some cases, a query tool may include a proximity search. In some cases, a proximity search matches only those documents that contain two or more words that are separated by a specified number of words, are in the same sentence, or an in the same paragraph. A query tool may include a regular expression. In some cases, a regular expression may employ a complex but powerful querying syntax that can be used to specify retrieval conditions with precision, for instance database syntax. A query tool may include a fuzzy search. In some cases, a fuzzy search may search for a document that matches given terms while allowing for some variation around them. In some cases, a query tool may include a wildcard search. In some cases, a wildcard search may substitute one or more characters in a search query for a wildcard character such as an asterisk. For example, using a wildcard, such as an asterisk, in a search query "s*n" will search for terms inclusive of "sin," "son," "sun," and the like.

Still referring to FIG. 1, apparatus 100 may also be configured to generate a data query as a function of user input 120, transport token 148, and/or summate value 160. Data query may search through the Internet for semantic elements matching semantic elements of user input 120 and/or transport 124. Data query may search through a transport database, such as transport database 200 as described below with reference to FIG. 2. In some embodiments, data query may include querying criteria. "Querying criteria" as used in this disclosure are parameters that constrain a search. Querying criteria may include a degree of similarity of user input 120 to transport data 116 of a database, freshness of data, source of data, and the like. In some embodiments, a similarity may be determined by a clustering algorithm, optimization model, and the like. Querying criteria may be tuned by a machine-learning model, such as a machine-learning model described below in FIG. 7.

Still referring to FIG. 1, generating data query may include generating a web crawler function. Data query may be configured to search for one or more keywords, key phrases, and the like. A keyword may be used by a search query to filter potential results from the search query. As a nonlimiting example, a keyword may include "on hold". Apparatus 100 may generate a data query. A search query may give a weight to one or more query criteria. "Weights", as used herein, may be multipliers or other scalar numbers reflecting a relative importance of a particular attribute or value. A weight may include, but is not limited to, a numerical value corresponding to an importance of an element. In some embodiments, a weighted value may be referred to in terms of a whole number, such as 1, 100, and the like. As a non-limiting example, a weighted value of 0.2 may indicated that the weighted value makes up 20% of the total value. In some embodiments, a data query may be configured to filter out one or more "stop words" that may not convey meaning, such as "of," "a," "an," "the," or the like.

With continued reference to FIG. 1, in some embodiments, data query may be performed with a text search, for example using a keyword as a search term. A text search may include techniques for searching a single computer-stored document or a collection of documents, for example in a database. A text search may include full-text search. Full-text search may be distinguished from searches based on metadata or on field-based searching (e.g., fields such as titles, abstracts, selected sections, or bibliographical references). In an exemplary full-text search, apparatus 100 may examine all words in every stored document as apparatus 100 tries to match search criteria (for example, keywords). Alternatively, a text search may be limited to fields, such as with field-based searching.

Still referring to FIG. 1, apparatus 100 may generate data query to match transport data 116 of user input 120 with one or more databases. For instance, and without limitation, apparatus 100 may determine user input 120 to include "bulk copper wire from Joe's electronics". Apparatus 100 may generate data query to find updated transport data 148 related to transport data 116 based on user input 120. In one or more embodiments, data query may include an identifier, as discussed previously in this disclosure, to quickly retrieve information related to a particular product or specific entity. In some embodiments, apparatus 100 may be configured to populate one or more text fields of GUI 140 as a function of results from a search query. Apparatus 100 may generate a confirmation icon, message, and the like associated with pre-populated text fields on GUI 140. In some embodiments, a confirmation message of pre-populated transport data 116 or updated transport data 148 may be rejected, such as through user input 120 and/or received input. Rejection may trigger an iterative process of apparatus 100 of providing pre-populated transport data 116 or updated transport data 148 until an acceptance of pre-populated data and/or an exit flag. An exit flag may include, without limitation, a quantity of iterations, input canceling pre-populated data, and the like. Apparatus 100 may use iterations of providing pre-populated transport data to improve accuracy of future pre-populated transport data.

Still referring to FIG. 1, apparatus 100 may update one or more attribute subgroups as updated attribute subgroups of transport 124. Updated attribute subgroup of transport 124 may be determined using similar methods described in relation to attribute subgroup 128. For example, and without limitation, attribute classifier 148, or a machine-learning model, may be used to determine updated stage subgroup as a function of updated transport data. In one or more embodiments, bound parameters 132 may also be used to determine updated attribute subgroup. In one or more embodiments, updated attribute subgroup may be displayed using GUI 140. In one or more embodiments, updated attribute subgroup may be used to identify an updated token and, ultimately, an updated summate value. Updated summate value may be presented to a user, such as a transport entity, on a GUI, as discussed further in this disclosure.

Figure 2:
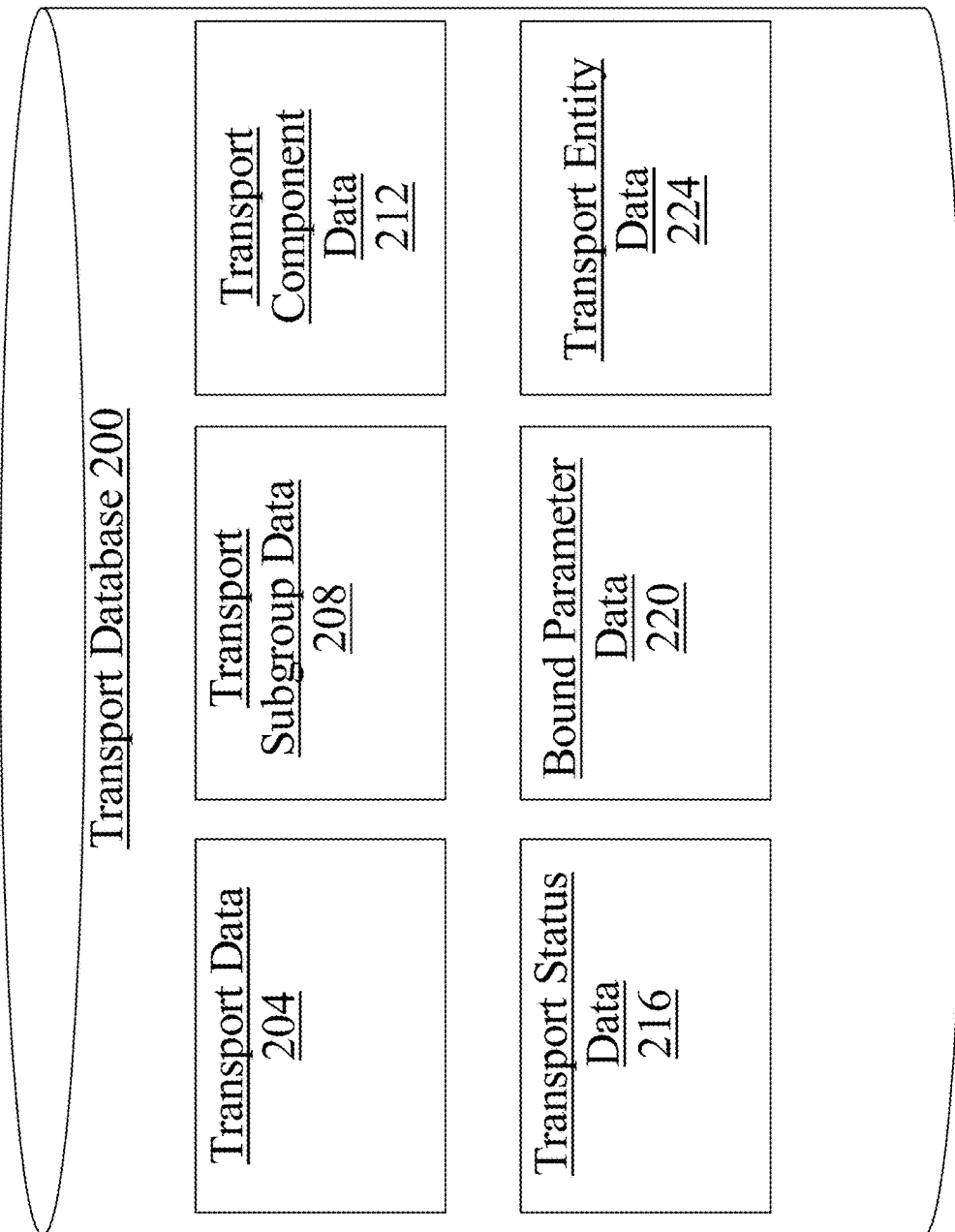
FIG. 2 is a diagram of a transport database in accordance with one or more embodiments of the present disclosure.

Referring now to FIG. 2, transport database 200 is presented. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 2, in some embodiments, transport database 200 may include transport data 204. Transport data 204 may include, without limitation, destinations, origins, stop points, transport identifiers, and the like. Transport data 204 may include transport data 116 and/or updated transport data 148 as described above with reference to FIG. 1.

Still referring to FIG. 2, in some embodiments, transport database 200 may include attribute subgroup data 208. Attribute subgroup data 208 may include, without limitation, stage subgroup categories, quantity of stage subgroups, stage subgroup criteria, and the like. In some embodiments, stage subgroup data 208 may be updated as a function of communication with transportation entity 136 as described above with reference to FIG. 1.

Still referring to FIG. 2, in some embodiments, transport database 200 may include transport component data 212. Transport component data 212 may include, but is not limited to, dimensions, weights, values, characteristics, statuses, and the like. Transport component data 212 may include transport component data as described above with reference to FIG. 1.

Still referring to FIG. 2, in some embodiments, transport database 200 may include transport status data 216. Transport status data 216 may include data such as, but not limited to, on hold, in transit, arriving, departing, delivered, expedited, overnight, and the like. Transport status data 216 may include status criteria that may categorize transports to one or more transport statuses. Transport status data may include transport statuses as described above with reference to FIG. 1.

Still referring to FIG. 2, in some embodiments, transport database 200 may include bound parameter data 220. Bound parameter data 220 may include, without limitation, transport criteria, such as delivery dates, costs, fuel quantities, and the like. In some embodiments, bound parameter data 220 may include statistics such as most frequently used bound parameter, average deviation of specific bound parameters, and the like. Bound parameters may be as described above with reference to FIG. 1.

Still referring to FIG. 2, in some embodiments, transport database 200 may include transport entity data 224. Transport entity data 224 may include, without limitation, location data, transport path data, and the like. Transport entity data 224 may include identifies of one or more transport entities, correlations between transport entities and transport component types, correlation between transport recipients and transport entities, and the like. Transport entity data 224 may include transport entity data as described above with reference to FIG. 1.

Figure 3:
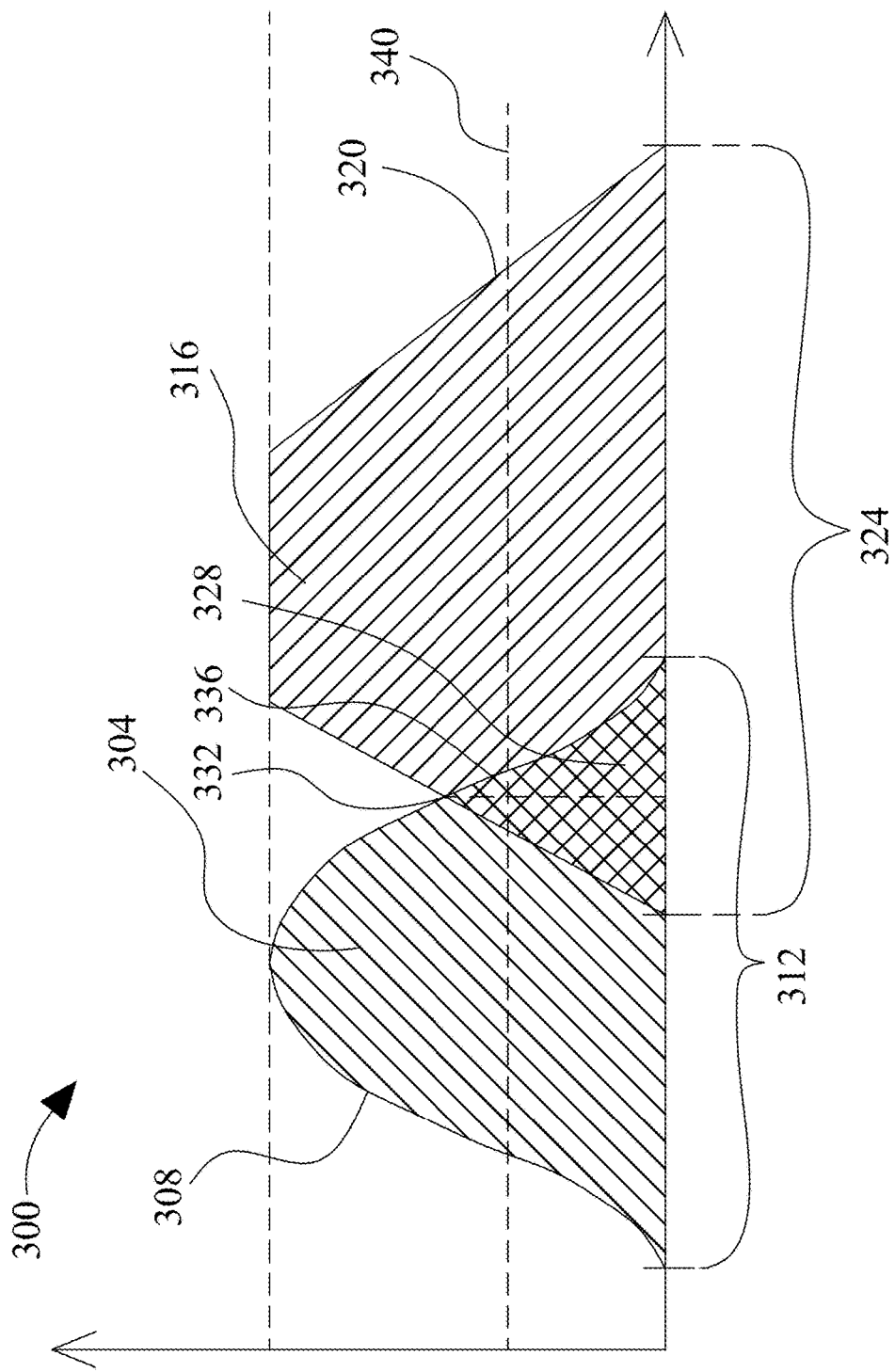
FIG. 3 is a diagram of a fuzzy logic system in accordance with one or more embodiments of the present disclosure.

Referring to FIG. 3, an exemplary embodiment of fuzzy set comparison 300 is illustrated. A first fuzzy set 304 may be represented, without limitation, according to a first membership function 308 representing a probability that an input falling on a first range of values 312 is a member of the first fuzzy set 304, where the first membership function 308 has values on a range of probabilities such as without limitation the interval [0,1], and an area beneath the first membership function 308 may represent a set of values within first fuzzy set 304. Although first range of values 312 is illustrated for clarity in this exemplary depiction as a range on a single number line or axis, first range of values 312 may be defined on two or more dimensions, representing, for instance, a Cartesian product between a plurality of ranges, curves, axes, spaces, dimensions, or the like. First membership function 308 may include any suitable function mapping first range 312 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \le x < b \\ \frac{c-x}{c-b}, \text{ if } b < x \le c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 3, first fuzzy set 304 may represent any value or combination of values as described above, including output from one or more machine-learning models and transport data, a predetermined class, such as without limitation an attribute subgroup. A second fuzzy set 316, which may represent any value which may be represented by first fuzzy set 304, may be defined by a second membership function 320 on a second range 324; second range 324 may be identical and/or overlap with first range 312 and/or may be combined with first range via Cartesian product or the like to generate a mapping permitting evaluation overlap of first fuzzy set 304 and second fuzzy set 316. Where first fuzzy set 304 and second fuzzy set 316 have a region 328 that overlaps, first membership function 308 and second membership function 320 may intersect at a point 332 representing a probability, as defined on probability interval, of a match between first fuzzy set 304 and second fuzzy set 316. Alternatively or additionally, a single value of first and/or second fuzzy set may be located at a locus 336 on first range 312 and/or second range 324, where a probability of membership may be taken by evaluation of first membership function 308 and/or second membership function 320 at that range point. A probability at 328 and/or 332 may be compared to a threshold 340 to determine whether a positive match is indicated. Threshold 340 may, in a non-limiting example, represent a degree of match between first fuzzy set 304 and second fuzzy set 316, and/or single values therein with each other or with either set, which is sufficient for purposes of the matching process; for instance, threshold may indicate a sufficient degree of overlap between an output from one or more machine-learning models and/or transport data and a predetermined class, such as without limitation a stage subgroup for combination to occur as described above. Alternatively or additionally, each threshold may be tuned by a machine-learning and/or statistical process, for instance and without limitation as described in further detail below.

Further referring to FIG. 3, in an embodiment, a degree of match between fuzzy sets may be used to classify a transport datum with a stage subgroup. For instance, if a transport datum has a fuzzy set matching stage subgroup fuzzy set by having a degree of overlap exceeding a threshold, apparatus 100 may classify the transport datum as belonging to the stage subgroup. Where multiple fuzzy matches are performed, degrees of match for each respective fuzzy set may be computed and aggregated through, for instance, addition, averaging, or the like, to determine an overall degree of match.

Still referring to FIG. 3, in an embodiment, a transport datum may be compared to multiple stage subgroup fuzzy sets. For instance, a transport datum may be represented by a fuzzy set that is compared to each of the multiple stage subgroup fuzzy sets; and a degree of overlap exceeding a threshold between the transport datum fuzzy set and any of the multiple stage subgroup fuzzy sets may cause apparatus 100 to classify the transport datum as belonging to stage subgroup. For instance, in one embodiment there may be two stage subgroup fuzzy sets, representing respectively first stage subgroup and second stage subgroup. First stage subgroup may have a first fuzzy set; Second stage subgroup may have a second fuzzy set; and a transport datum may have a transport datum fuzzy set. Apparatus 100, for example, may compare a transport datum fuzzy set with each of first stage subgroup fuzzy set and second stage subgroup fuzzy set, as described above, and classify a transport datum to either, both, or neither of first stage subgroup or second stage subgroup. Machine-learning methods as described throughout may, in a non-limiting example, generate coefficients used in fuzzy set equations as described above, such as without limitation x, c, and σ of a Gaussian set as described above, as outputs of machine-learning methods. Likewise, a transport datum may be used indirectly to determine a fuzzy set, as a transport datum fuzzy set may be derived from outputs of one or more machine-learning models that take the transport datum directly or indirectly as inputs.

Still referring to FIG. 3, a computing device may use a logic comparison program, such as, but not limited to, a fuzzy logic model to determine a stage subgroup ranking. A stage subgroup ranking may include, but is not limited to, bad, average, good, superior, and the like; each such stage subgroup ranking may be represented as a value for a linguistic variable representing stage subgroup rankings or in other words a fuzzy set as described above that corresponds to a degree of compatibility as calculated using any statistical, machine-learning, or other method that may occur to a person skilled in the art upon reviewing the entirety of this disclosure. In other words, a given element of transport datum may have a first non-zero value for membership in a first linguistic variable value such as "1" and a second non-zero value for membership in a second linguistic variable value such as "2" In some embodiments, determining a stage subgroup arrangement may include using a linear regression model. A linear regression model may include a machine learning model. A linear regression model may be configured to map data of transport data such as transport components, transport paths, costs, and the like, to one or more stage subgroup arrangements. A linear regression model may be trained using training data correlating stage subgroups to stage subgroup arrangements. A linear regression model may map statistics such as, but not limited to, frequency of stage subgroup arrangement types, most efficient stage subgroup arrangements, and the like. In some embodiments, determining a stage subgroup arrangement of a transport datum may include using a stage subgroup arrangement classification model. A stage subgroup arrangement classification model may be configured to input collected data and cluster data to a centroid based on, but not limited to, frequency of appearance, linguistic indicators of stage subgroup arrangements, and the like. Centroids may include scores assigned to them such that elements of transport data may each be assigned a score. In some embodiments, a stage subgroup arrangement classification model may include a K-means clustering model. In some embodiments, a stage subgroup arrangement classification model may include a particle swarm optimization model. In some embodiments, determining a stage subgroup arrangement of transport data may include using a fuzzy inference engine. A fuzzy inference engine may be configured to map one or more transport data elements using fuzzy logic. In some embodiments, a plurality of transports may be arranged by a logic comparison program into stage subgroup arrangements. A "stage subgroup arrangement" as used in this disclosure is any grouping of transport vehicles and/or transport components. This step may be implemented as described above in FIGS. 1-3. Membership function coefficients and/or constants as described above may be tuned according to classification and/or clustering algorithms. For instance, and without limitation, a clustering algorithm may determine a Gaussian or other distribution of questions about a centroid corresponding to a given compatibility level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 3, an inference engine may be implemented according to input and/or output membership functions and/or linguistic variables. For instance, a first linguistic variable may represent a first measurable value pertaining to elements of transport data, such as a degree of relevance of an element of transport data, while a second membership function may indicate a degree of compatibility of a subject thereof, or another measurable value pertaining to transport data. Continuing the example, an output linguistic variable may represent, without limitation, a score value. An inference engine may combine rules, such as: "if the transport component has a status of 'expedited' and the stage subgroup has a performance score of 'fast', the matching probability is 'high'"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity ($T(a, b)=T(b, a)$), monotonicity: ($T(a, b) \le T(c, d)$ if $a \le c$ and $b \le d$), (associativity: $T(a, T(b, c))=T(T(a, b), c)$), and the requirement that the number 1 acts as an identity element. Combinations of rules ("and" or "or" combination of rule membership determinations) may be performed using any T-conorm, as represented by an inverted T symbol or "⊥" such as max(a, b), probabilistic sum of a and b (a+b-a*b), bounded sum, and/or drastic T-conorm; any T-conorm may be used that satisfies the properties of commutativity: $\perp(a, b)=\perp(b, a)$, monotonicity: $\perp(a, b) \le \perp(c, d)$ if $a \le c$ and $b \le d$, associativity: $\perp(a, \perp(b, c))=\perp(\perp(a, b), c)$, and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

Further referring to FIG. 3, transport data to be used may be selected by user selection, and/or by selection of a distribution of output scores, such as 30% low relevancy, 40% superior relevancy, and 30% average relevancy. Each relevancy score may be selected using an additional function such as degree of compatibility as described above.

Figure 4:
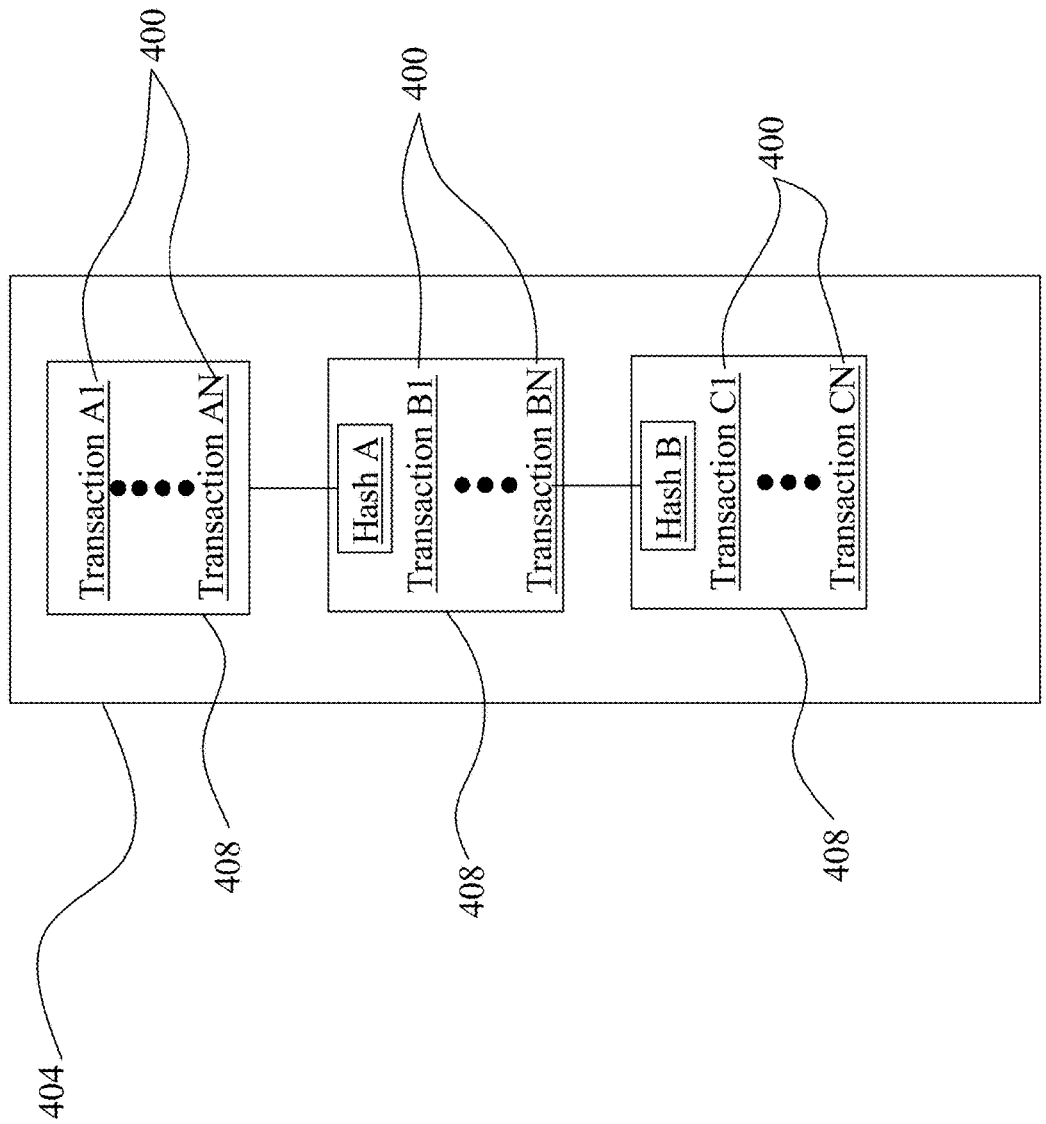
FIG. 4 is a diagram of an immutable sequential listing in accordance with one or more embodiments of the present disclosure.

Referring now to FIG. 4, an exemplary embodiment of an immutable sequential listing 400 is illustrated. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered. Data elements are listing in immutable sequential listing 400; data elements may include any form of data, including textual data, image data, encrypted data, cryptographically hashed data, and the like. Data elements may include, without limitation, one or more at least a digitally-signed assertions. In one embodiment, a digitally signed assertion 404 is a collection of textual data signed using a secure proof as described in further detail below; secure proof may include, without limitation, a digital signature as described above.

Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 404. In an embodiment, collection of textual data states that the owner of a certain transferable item represented in a digitally signed assertion 404 register is transferring that item to the owner of an address. A digitally signed assertion 404 may be signed by a digital signature created using the private key associated with the owner's public key, as described above.

Still referring to FIG. 4, a digitally signed assertion 404 may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g. a ride share vehicle or any other asset. A digitally signed assertion 404 may describe the transfer of a physical good; for instance, a digitally signed assertion 404 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 404 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 4, in one embodiment, an address is a textual datum identifying the recipient of virtual currency or another item of value in a digitally signed assertion 404. In some embodiments, address is linked to a public key, the corresponding private key of which is owned by the recipient of a digitally signed assertion 404. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 404 may record a subsequent a digitally signed assertion 404 transferring some or all of the value transferred in the first a digitally signed assertion 404 to a new address in the same manner. A digitally signed assertion 404 may contain textual information that is not a transfer of some item of value in addition to, or as an alternative to, such a transfer. For instance, as described in further detail below, a digitally signed assertion 404 may indicate a confidence level associated with a distributed storage node as described in further detail below.

In an embodiment, and still referring to FIG. 4, immutable sequential listing 400 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 1XX may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 4, immutable sequential listing 400 may preserve the order in which the at least a posted content took place by listing them in chronological order; alternatively or additionally, immutable sequential listing 400 may organize digitally signed assertions 404 into sub-listings 408 such as "blocks" in a blockchain, which may be themselves collected in a temporally sequential order; digitally signed assertions 404 within a sub-listing 408 may or may not be temporally sequential. The ledger may preserve the order in which at least a posted content took place by listing them in sub-listings 408 and placing the sub-listings 408 in chronological order. The immutable sequential listing 400 may be a distributed, consensus-based ledger, such as those operated according to the protocols promulgated by Ripple Labs, Inc., of San Francisco, Calif., or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 400 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 4, immutable sequential listing 400, once formed, may be inalterable by any party, no matter what access rights that party possesses. For instance, immutable sequential listing 400 may include a hash chain, in which data is added during a successive hashing process to ensure non-repudiation. Immutable sequential listing 400 may include a block chain. In one embodiment, a block chain is immutable sequential listing 400 that records one or more new at least a posted content in a data item known as a sub-listing 408 or "block." An example of a block chain is the BITCOIN block chain used to record BITCOIN transactions and values. Sub-listings 408 may be created in a way that places the sub-listings 208 in chronological order and link each sub-listing 408 to a previous sub-listing 408 in the chronological order so that any computing device may traverse the sub-listings 408 in reverse chronological order to verify any at least a posted content listed in the block chain. Each new sub-listing 408 may be required to contain a cryptographic hash describing the previous sub-listing 408. In some embodiments, the block chain contains a single first sub-listing 408 sometimes known as a "genesis block."

Still referring to FIG. 4, the creation of a new sub-listing 408 may be computationally expensive; for instance, the creation of a new sub-listing 408 may be designed by a "proof of work" protocol accepted by all participants in forming the immutable sequential listing 400 to take a powerful set of computing devices a certain period of time to produce. Where one sub-listing 408 takes less time for a given set of computing devices to produce the sub-listing 408 protocol may adjust the algorithm to produce the next sub-listing 408 so that it will require more steps; where one sub-listing 408 takes more time for a given set of computing devices to produce the sub-listing 408 protocol may adjust the algorithm to produce the next sub-listing 408 so that it will require fewer steps. As an example, protocol may require a new sub-listing 408 to contain a cryptographic hash describing its contents; the cryptographic hash may be required to satisfy a mathematical condition, achieved by having the sub-listing 408 contain a number, called a nonce, whose value is determined after the fact by the discovery of the hash that satisfies the mathematical condition. Continuing the example, the protocol may be able to adjust the mathematical condition so that the discovery of the hash describing a sub-listing 408 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 408 according to the protocol is known as "mining." The creation of a new sub-listing 408 may be designed by a "proof of stake" protocol as will be apparent to those skilled in the art upon reviewing the entirety of this disclosure.

Continuing to refer to FIG. 4, in some embodiments, protocol also creates an incentive to mine new sub-listings 408. The incentive may be financial; for instance, successfully mining a new sub-listing 408 may result in the person or entity that mines the sub-listing 408 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 408 Each sub-listing 408 created in immutable sequential listing 400 may contain a record or at least a posted content describing one or more addresses that receive an incentive, such as virtual currency, as the result of successfully mining the sub-listing 408.

With continued reference to FIG. 4, where two entities simultaneously create new sub-listings 408, immutable sequential listing 400 may develop a fork; protocol may determine which of the two alternate branches in the fork is the valid new portion of the immutable sequential listing 400 by evaluating, after a certain amount of time has passed, which branch is longer. "Length" may be measured according to the number of sub-listings 408 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 408 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 400 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 400.

Still referring to FIG. 4, additional data linked to at least a posted content may be incorporated in sub-listings 408 in the immutable sequential listing 400; for instance, data may be incorporated in one or more fields recognized by block chain protocols that permit a person or computer forming a at least a posted content to insert additional data in the immutable sequential listing 400. In some embodiments, additional data is incorporated in an unspendable at least a posted content field. For instance, the data may be incorporated in an OP_RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 4, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 208 in a block chain computationally challenging; the incentive for producing sub-listings 208 may include the grant of new crypto-currency to the miners. Quantities of crypto-currency may be exchanged using at least a posted content as described above.

Figure 5:
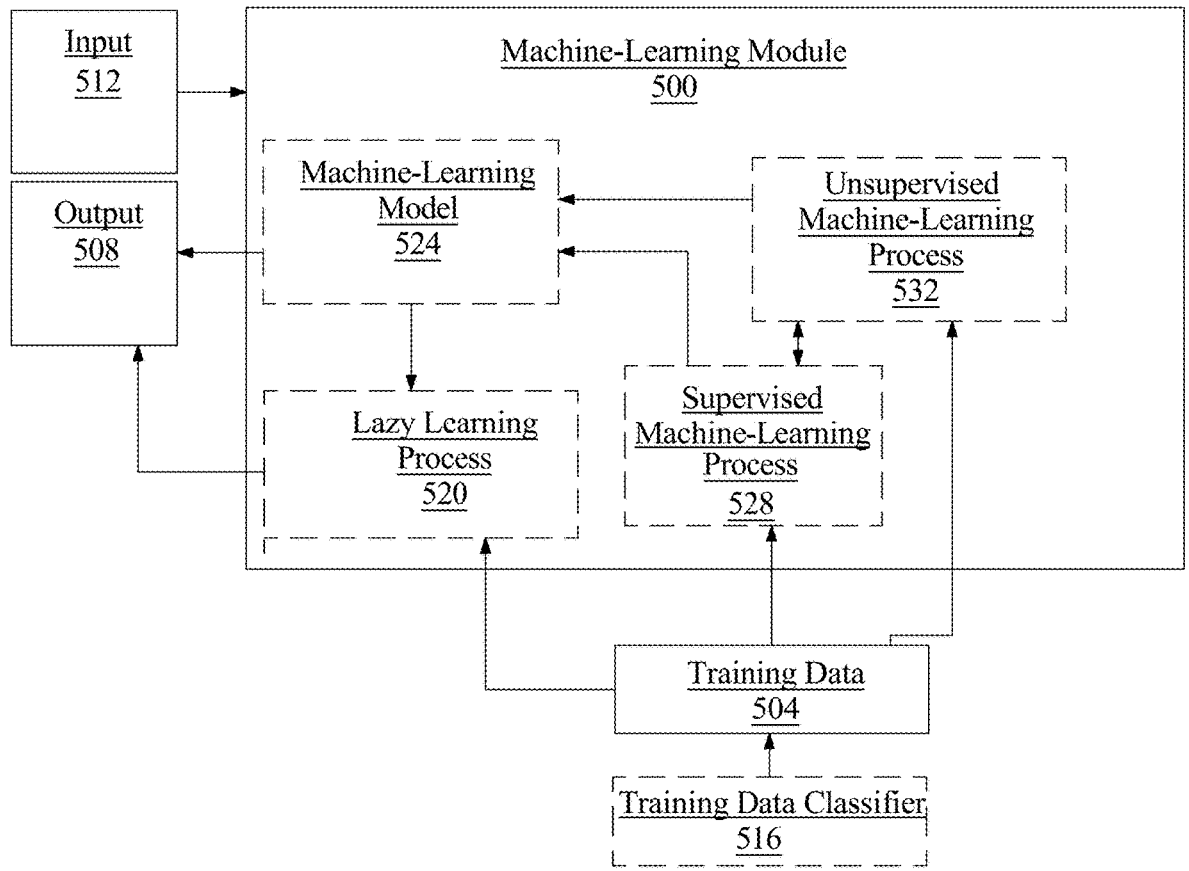
FIG. 5 is a block diagram of a machine-learning model in accordance with one or more embodiments of the present disclosure.

Referring now to FIG. 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm that will be performed by a computing device/module to produce outputs 508 given data provided as inputs 512; this is in contrast to a non-machine learning software program where the commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative example inputs may include transport data and outputs may include stage subgroups.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 500 may generate a classifier using a classification algorithm, defined as a processes whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 516 may classify elements of training data to transport statuses, transport categories, transport component types, and the like.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include transport data as described above as inputs, stage subgroups as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 6:
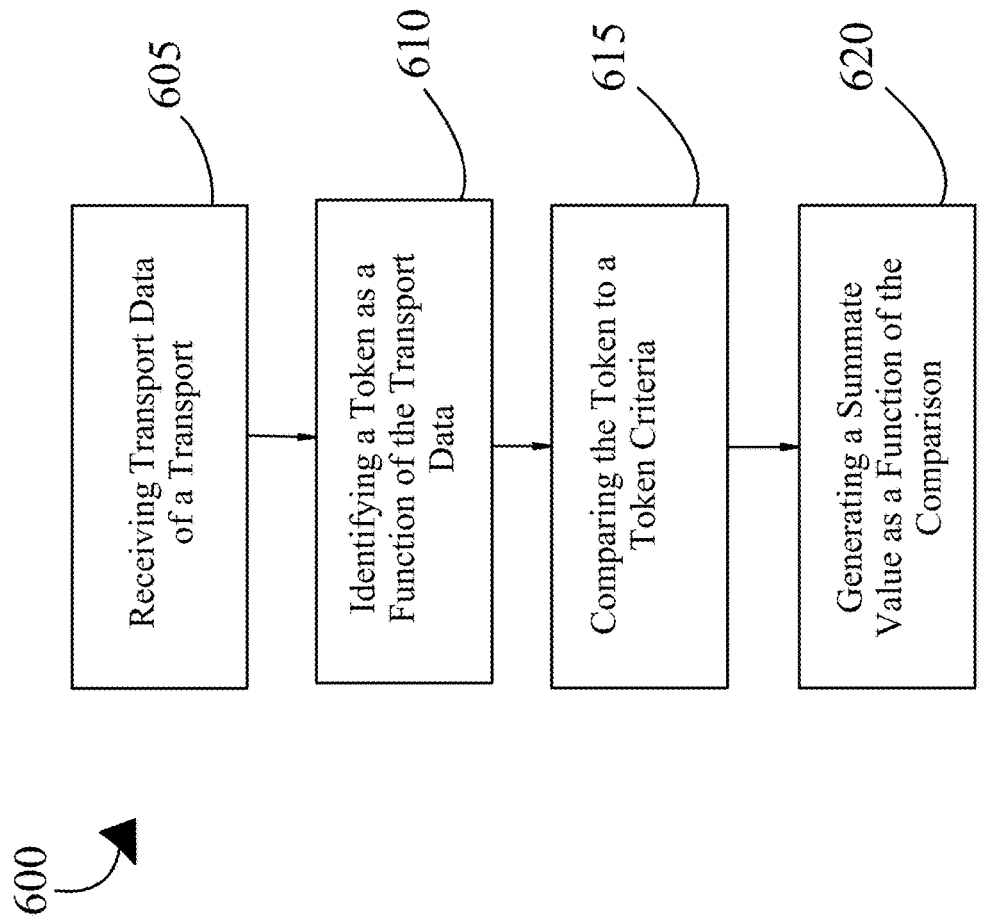
FIG. 6 is a flowchart of a method of tracking a multi-point transport in accordance with one or more embodiments of the present disclosure.

Referring now to FIG. 6, a method 600 of using an apparatus for token tracking is presented. At step 605, method 600 includes receiving transport data. Transport data may be received through user input, from external computing devices, such as a remote device of a transportation entity, and the like. A transport entity may include, without limitation, a carrier, supplier, warehouse system, cross-dock facility, and the like. In some embodiments, transport data may include, without limitation, origins, destinations, dates, times, transport component data, costs, stages, and the like. This step may be implemented as described above in FIGS. 1-5, without limitation.

Still referring to FIG. 6, at step 605, method 600 includes identifying a transport token as a function of the transport data, where the transport token may be associated with an attribute of the transport. This step may be implemented as described above in FIGS. 1-5, without limitation.

Still referring to FIG. 6, at step 615, method 600 includes comparing the transport token with a token criteria. Token criteria may include a threshold, which may include a minimum or maximum parameter or a range of values associated with the transport token that are considered acceptable. This step may be implemented as described above in FIGS. 1-5, without limitation.

Still referring to FIG. 6, at step 620, method 600 includes generating a summate value as a function of the comparison. This step may be implemented as described above in FIGS. 1-5, without limitation.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
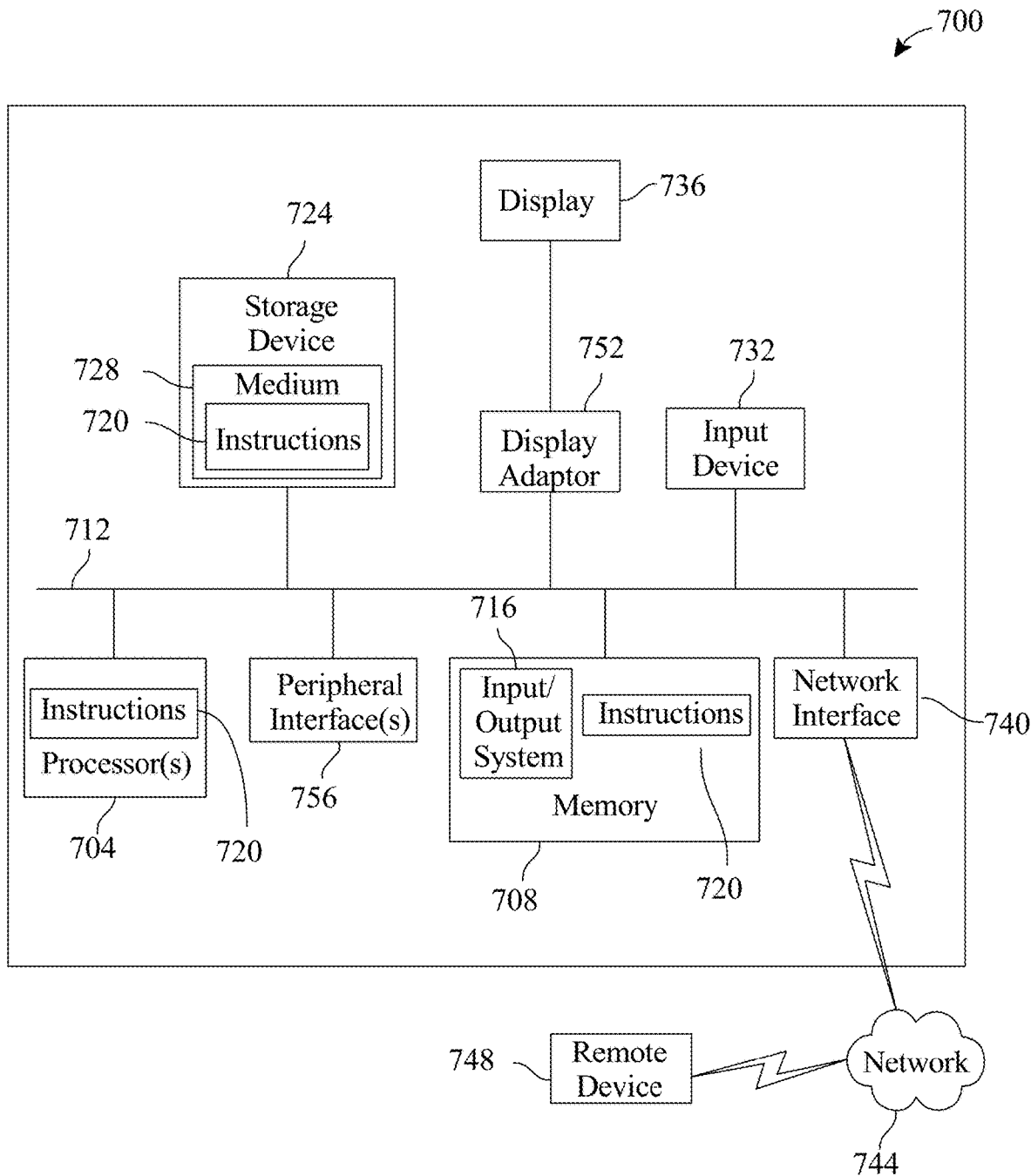
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for transport stage token tracking, the apparatus comprising:
   at least a processor; and
   a memory communicatively connected to the at least a processor, the memory containing instructions configuring the at least a processor to:
     receive transport data of a transport, wherein the transport comprises an attribute;
     train an attribute subgroup classifier, wherein the attribute subgroup classifier is a machine learning model using attribute subgroup training data, wherein the attribute subgroup training data correlates transport data elements to stage token elements;
     classify the attribute to an attribute subgroup using the attribute subgroup classifier, wherein the attribute subgroup classifier inputs the transport data and outputs a classification of the transport data to at least an attribute subgroup;
     identify a first transport token as a function of the classified transport data, wherein the first transport token is associated with the attribute of the transport;
     compare the first transport token to a first token criteria, wherein the first token criteria comprises a preconfigured threshold for a value of the first transport token, wherein comparing the first transport token to the first token criteria comprises minimizing or maximizing an objective function;
     identify a second transport token as a function of the transport data, wherein:
       the first transport token comprises a pecuniary amount for a customer; and
       the second transport token comprises a date the pecuniary amount is due from the customer;
     compare the second transport token to a second token criteria, wherein comparing the second transport token to the second token criteria comprises comparing the date the pecuniary amount is due and a current date; and
     generate a summate value as a function of the comparison between the first transport token and the first token criteria and the comparison between the second transport token and the second token criteria, wherein generating the summate value comprises adjusting the pecuniary amount for the customer if the date the pecuniary amount is due is before the current date;
   wherein the memory contains instructions further configuring the at least a processor to:
     receive training data correlating transport token elements and token criteria elements to summate value elements; and
     train a summate machine-learning model with the training data, wherein the summate machine-learning model is configured to input the first and second transport tokens and the first and second token criteria and output the summate value.

2. The apparatus of claim 1, wherein the transport data is received from a transport entity.

3. The apparatus of claim 1, wherein the attribute comprises a destination.

4. The apparatus of claim 1, wherein the transport data comprises geographical data.

5. The apparatus of claim 1, wherein identifying the first transport token comprises categorizing the transport data into one or more attribute subgroups as a function of the transport data.

6. The apparatus of claim 1, wherein the summate value comprises an invoice quantity.

7. The apparatus of claim 1, wherein the memory contains instructions further configuring the at least a processor to store at least one of the first transport token and the second transport token on an immutable sequential listing.

8. The apparatus of claim 1, wherein the memory contains instructions further configuring the at least a processor to generate a data query and retrieve updated transport data using the data query.

9. The apparatus of claim 8, wherein retrieving the updated transport data comprises communicating with a transport database.

10. The apparatus of claim 1, wherein receiving the transport data comprises receiving the transport data as a function of a user input.

11. The apparatus of claim 1, wherein the memory contains instructions further configuring the at least a processor to display the summate value through a graphical user interface.

12. A method of tracking a token of a transport, the method comprising:
    receiving, by a processor, transport data of a transport;

identifying, by the processor, a transport token as a function of the transport data, wherein the transport token is associated with an attribute of the transport;

training, by the processor, an attribute subgroup classifier, wherein the attribute subgroup classifier is a machine learning model using attribute subgroup training data, wherein the attribute subgroup training data correlates transport data elements to stage token elements;

classifying, by the processor, the attribute to an attribute subgroup using the attribute subgroup classifier, wherein the attribution subgroup classifier inputs the transport data and outputs a classification of the transport data to at least an attribute subgroup;

identifying, by the processor, a first transport token as a function of the classified transport data, wherein the first transport token is associated with the attribute of the transport;

comparing, by the processor, the first transport token to a first token criteria, wherein the first token criteria comprises a preconfigured threshold for a value of the first transport token, wherein comparing the first transport token to the first token criteria comprises minimizing or maximizing an objective function;

identifying, by the processor, a second transport token as a function of the transport data, wherein:
the first transport token comprises a pecuniary amount for a customer; and
the second transport token comprises a date the pecuniary amount is due from the customer;

comparing, by the processor, the second transport token to a second token criteria, wherein comparing the second transport token to the second token criteria comprises comparing the date the pecuniary amount is due and a current date; and generating, by the processor, a summate value as a function of the comparison between the first transport token and the first token criteria and the comparison between the second transport token and the second token criteria, wherein generating the summate value comprises adjusting the pecuniary amount for the customer if the date the pecuniary amount is due is before the current date;

wherein generating the summate value comprises:
receiving, by a summate machine-learning module, training data correlating transport token elements and token criteria elements to summate value elements; and
generating, by the summate machine-learning module, a summate machine-learning model with the training data, wherein the summate machine-learning model is configured to input the first and second transport tokens and the first and second token criteria and output the summate value.

13. The method of claim 12, wherein identifying the first transport token comprises categorizing the transport data into one or more attribute subgroups as a function of the transport data.

14. The method of claim 12, wherein the summate value comprises an invoice quantity.

15. The method of claim 12, further comprising storing, by the processor, at least one of the first transport token and the second transport token on an immutable sequential listing.

16. The method of claim 12, further comprising generating, by the processor, a data query and retrieving, by the processor, updated transport data using the data query.

* * * * *